July 22, 1930.　　　　　C. A. SCHMIDT　　　　　1,771,319
VEHICLE BUMPER
Filed April 13, 1929
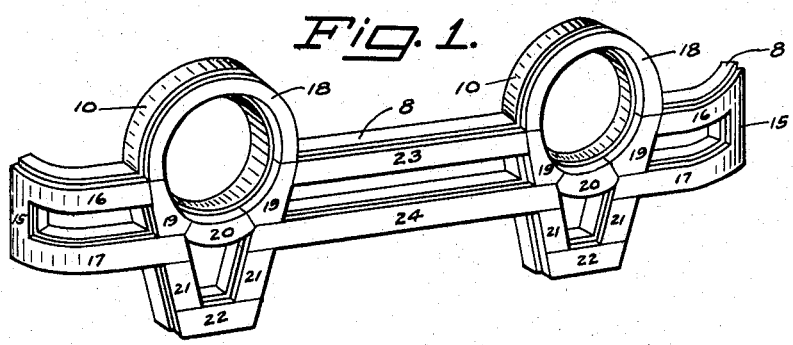
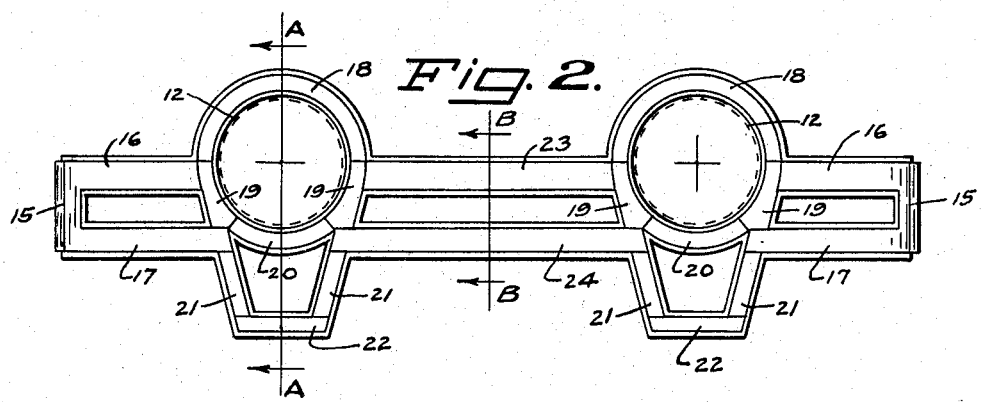
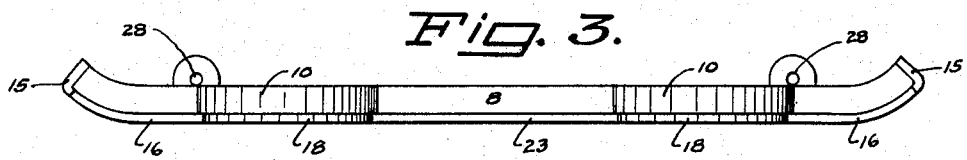
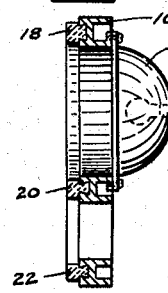
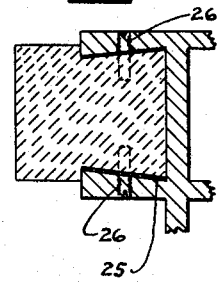
INVENTOR.
CARLOS A. SCHMIDT
BY
George F. Ballay
ATTORNEY.

Patented July 22, 1930

1,771,319

UNITED STATES PATENT OFFICE

CARLOS A. SCHMIDT, OF OAKLAND, CALIFORNIA

VEHICLE BUMPER

Application filed April 13, 1929. Serial No. 354,802.

This invention relates to improvements in vehicle bumpers and particularly relates to that class known as automobile bumpers that are made out of resilient metal and provided with some suitable grade of elastic material, such as rubber, on the front portion thereof, and extends outwardly therefrom for the purpose of preventing injury, such as scratching and denting of other objects when the bumper comes into contact with other objects and especially with other automobiles. The invention also relates to an improved construction that will completely protect the automobile lamps from damage or breakage, the said construction being made in an improved form that will improve the durability and efficiency of automobile bumpers.

The present invention further relates to and is an improvement upon the invention set forth in my patent for vehicle bumper, Number 1,645,723 under date of October 18, 1927. In that patent there were illustrated and described certain types of elastic buffer members on the front side of the bumper, together with telescopic members having spring means normally held under compression against the rear side of the bumper. There were not illustrated and described or claimed in that invention, however, any elastic members extending from end to end across the entire front of the bumper, or any means for guarding, holding or protecting the automobile lamps. The present invention is therefore, especially, an improvement upon the invention set forth in Patent Number 1,645,723 and may be used on that particular type of bumper or may be used on any other type of bumper to which it can be applied.

It is an object of the present invention, first, to improve the method of applying elastic material to automobile bumpers; second, to preferably apply the elastic material longitudinally across the entire front face of the bumper; third, to preferably fasten the elastic material detachably in the bumper; fourth, to preferably mount the said elastic material in the bumper in sections, arranged adjacent each other, so that if a portion of the material became damaged it would be necessary to replace the damaged portion only; fifth, to provide a plurality of guards on the bumper that are designed to fit completely around the front end of the automobile lamps and permit the rays of the light to shine therethrough; sixth, to mount the lights on said bumper, or on the automobile in the rear of said guards on the bumper and to make the guards and arrange same in front of the lamps in such a manner and distance therefrom that will permit the lamps to extend within the guards should an impact cause the bumper and guards to be forced or bent inwardly; seventh, to provide elastic material on the front end of said guards; eighth, to preferably provide elastic material completely around the front end of the guards; ninth, to preferably provide the elastic material of such a thickness that will permit the said material to extend in front of the bumper and guards a distance that will cause the said elastic material to absorb a certain amount of shock that would be transmitted to the bumper by an impact; tenth, to preferably construct the said bumper in the particular form illustrated so as to provide for durability and efficiency.

The invention further consists in the particular combination, form of construction and arrangement of the different parts such as described in the following specification, and possesses various other objects and features of advantage, some of which, with the foregoing, will be made manifest in the preferred form of the invention that is illustrated in the drawings accompanying and forming part of the specification.

It is to be understood that it is not intended to limit the invention to the embodiment shown by said drawings and description, as variations may be adapted within the scope of the invention as set forth in the subjoined claims.

In the accompanying drawings:

Figure 1 is a perspective view illustrating a preferred form of the invention.

Figure 2 is a front plan view of one type of bumper involving the invention.

Figure 3 is a top plan view of the invention.

Figure 4 is a sectional view taken on line A—A of Figure 2, looking in direction of the arrows, showing the relative position of the automobile lamp with respect to the bumper.

Figure 5 is a sectional view taken on line B—B of Figure 2.

Figure 6 is an enlarged cross sectional view taken through one of the grooves provided in the front of the bumper, showing one method of holding the elastic material detachably therein.

Figure 7 is a perspective view of one of the tapered grooves provided in the bumper for holding the elastic material.

Referring in detail to the different parts wherein like reference characters denote corresponding parts throughout the different views, the numeral 3 designates one form of vehicle bumper used, and consists of an oblong member having longitudinal openings between the ends thereof, the said ends being preferably curved as shown in Figures 1 and 3.

As hereinbefore stated, one of the objects of the present invention is the provision of a lamp guard on the bumper that will permit the rays of the light to shine therethrough. In the accompanying illustration there is shown a pair of lamp guards 10 that are provided on to the bumper 8 by being formed thereon, and are preferably made annular to conform to the shape of the automobile lamps, but it is to be definitely understood that the said guards may have any suitable shape and be formed directly on the bumper or fastened thereto in any suitable manner that will serve the purpose of the invention. Figure 4 illustrates an automobile lamp 12 fastened on to the bumper directly in the rear of the lamp guard 10 where the rays of light from the lamp can shine therethrough. The lamps may also be fastened to the automobile directly in the rear of the guards so that if the bumper should be bent inwardly by an impact, the lamp guard portion thereof will move back over the lamps, it being understood that the lamps would be of a size that would permit the inner periphery of the guards to clear the outer periphery of the lamp casings. From the foregoing it will be seen that the principle of the invention exists in providing lamp guards on the bumper and providing the lamps directly in the rear of the guards and fastening said lamps to any suitable means that will permit the light rays therefrom to shine through the guards.

The improved method of providing the elastic material in the bumper is shown as comprising a plurality of oblong elastic members that are mounted in the front side of the bumper and extend across the entire length of the bumper and around the curved sides thereof. The preferred type of material used is rubber, but it is to be understood that any suitable non-scratchable material that will serve the purpose of the invention may be used. Though rubber is preferable, such material as wood, leather, paper compounds, and different types of fibrous or flexible materials may be used. The rubber may be vulcanized on the bumper if desired, but is preferably provided in sections and fastened detachably thereon so that different sections may be easily and quickly replaced in case of damage.

The bumper is provided with a plurality of dove-tail grooves 25 as shown in Figures 6 and 7, the said grooves extending longitudinally across the entire front of the bumper and around the circular shaped lamp guards and also in the curved ends of the bumper. The elastic material is provided in oblong and annular sections and mounted in their respective positions as shown in Figure 2 and are held detachably therein by the angular shape of the grooves 25, screws 26 also being applied when necessary. Numerals 16, 17, 21, 22, 23 and 24 designate oblong sections of the elastic material that are mounted in their respective positions across the front face of the bumper, and numerals 18, 19 and 20, the circular sections that are mounted around the guards, and the numeral 15 the sections that are mounted into the curved ends. The elastic material preferably extends in front of the bumper as illustrated in Figures 4, 5 and 6.

From the foregoing it will be observed that the present invention possesses many advantageous features. The providing of the elastic material across the entire front face and curved ends of the bumper will absolutely prevent any denting or scratching caused by the ordinary impacts or frictional contacts. The providing of the elastic material in the manner as described will serve as an improved cushion to absorb the small shocks caused by an impact. The providing of the angular shaped grooves is a simple method of holding the elastic material detachably to the bumper. The providing of the said material in sections into the bumper makes it possible to replace the damaged section only, in case of an impact. The providing of lamp guards on the bumper and mounting the lamps in the rear of the guards is an improved method of protecting the lamps against breakage. The providing of all of the said elements in combination makes a complete unit of manufacture that produces new and useful results not achieved by any other automobile bumper now in use.

Having thus illustrated and described a certain form of construction and arrangement of parts pertaining to the invention, it is to be definitely understood that the improvements may be embodied in any type of automobile bumper, either the front or the rear, which, obviously, may be built up in any suitable manner, and fastened to the automobile in any suitable position, the present illustration not being utilized as indicating the only form of construction into which the parts may be made; and it is desired to include in this application for Letters Patent of the United States of America, any and all patentable novelty that exists in the invention disclosed and all that comes within the range of the invention as set forth in the claims hereinafter mentioned.

What is claimed:

1. A bumper for motor vehicles, having in combination, an impact bar; a plurality of lamp guards provided thereon; elastic material provided on the front face of the bar and around said lamp guards; said elastic material extending beyond the front face of said bar and lamp guards.

2. A bumper for motor vehicles, having in combination, an impact bar; a plurality of lamp guards provided thereon; elastic material, made in sections and arranged adjacent each other on the front face of said bar and guards; said elastic material extending beyond the front face of said bar and guards and fastened detachably thereon.

In testimony that I claim the foregoing I have hereto set my hand this thirteenth day of February, 1929.

CARLOS A. SCHMIDT.